(12) United States Patent
Takaki

(10) Patent No.: US 10,535,264 B2
(45) Date of Patent: Jan. 14, 2020

(54) OBJECT DETECTION APPARATUS AND OBJECT DETECTION METHOD

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/094,772

(22) PCT Filed: Apr. 19, 2017

(86) PCT No.: PCT/JP2017/015778
§ 371 (c)(1),
(2) Date: Oct. 18, 2018

(87) PCT Pub. No.: WO2017/183667
PCT Pub. Date: Oct. 26, 2017

(65) Prior Publication Data
US 2019/0130752 A1  May 2, 2019

(30) Foreign Application Priority Data
Apr. 22, 2016  (JP) .................. 2016-086408

(51) Int. Cl.
*G01B 11/14* (2006.01)
*G08G 1/16* (2006.01)
(Continued)

(52) U.S. Cl.
CPC .................. *G08G 1/16* (2013.01); *B60T 7/12* (2013.01); *B60W 30/08* (2013.01); *G01S 13/867* (2013.01);
(Continued)

(58) Field of Classification Search
CPC ...... G08G 1/16; G06K 9/6288; G06K 9/2054; G06K 9/00791; G01S 13/931;
(Continued)

(56) References Cited

U.S. PATENT DOCUMENTS

2006/0274149 A1* 12/2006 Yoshizawa .......... B60R 21/0134
  348/148
2008/0079954 A1*  4/2008 Iwaki .................. G01C 3/08
  356/614
(Continued)

FOREIGN PATENT DOCUMENTS

JP  2007-015676 A  1/2007
JP  2012-001063 A  1/2012
(Continued)

*Primary Examiner* — Howard D Brown, Jr.
(74) *Attorney, Agent, or Firm* — Knobbe, Martens, Olson & Bear, LLP

(57) ABSTRACT

An ECU recognizes an object detected by a radar sensor and an object detected by a camera sensor as the same object on condition that there is an overlapping region between a reflected wave search region and an image search region. The ECU determines the brightness in the direction in which the object is detected by the camera sensor in response to recognizing the object detected by the radar sensor and the object detected by the camera sensor as the same object. The ECU then changes the size of the image search region based on the determined brightness in the direction in which the object is detected.

9 Claims, 13 Drawing Sheets

(51) Int. Cl.
  *B60T 7/12* (2006.01)
  *B60W 30/08* (2012.01)
  *G01S 13/86* (2006.01)
  *G06K 9/00* (2006.01)
  *G06K 9/20* (2006.01)
  *G06K 9/62* (2006.01)

(52) U.S. Cl.
  CPC ........ *G01S 13/931* (2013.01); *G06K 9/00791* (2013.01); *G06K 9/2054* (2013.01); *G06K 9/6288* (2013.01)

(58) Field of Classification Search
  CPC ........ G01S 13/867; B60W 30/08; B60T 7/12; G01V 11/00; B60R 21/00
  See application file for complete search history.

(56) References Cited

U.S. PATENT DOCUMENTS

| | | | |
|---|---|---|---|
| 2009/0243826 A1* | 10/2009 | Touge | B60Q 9/00 340/436 |
| 2013/0182540 A1* | 7/2013 | Lyons | F15B 15/2884 367/99 |
| 2013/0194086 A1* | 8/2013 | Igarashi | G06K 9/00805 340/435 |
| 2014/0139369 A1* | 5/2014 | Baba | G01S 13/867 342/146 |
| 2016/0334505 A1* | 11/2016 | Naruse | G01S 15/931 |
| 2017/0294125 A1* | 10/2017 | Matsuura | G01S 7/524 |
| 2018/0029604 A1* | 2/2018 | Niino | G08G 1/052 |

FOREIGN PATENT DOCUMENTS

| | | |
|---|---|---|
| JP | 2012-048643 A | 3/2012 |
| JP | 2014-122873 A | 7/2014 |

* cited by examiner

FIG.8
(a) 
(b) 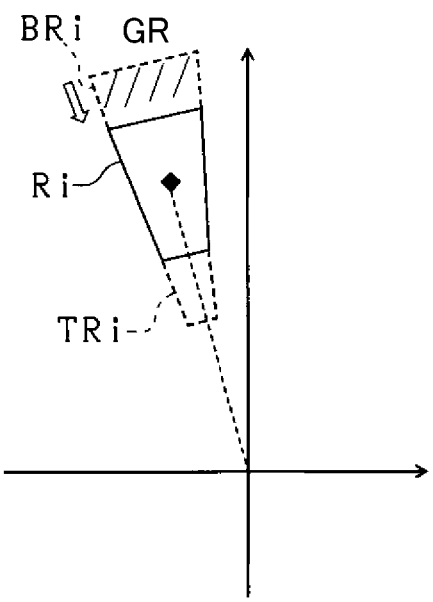
(c) 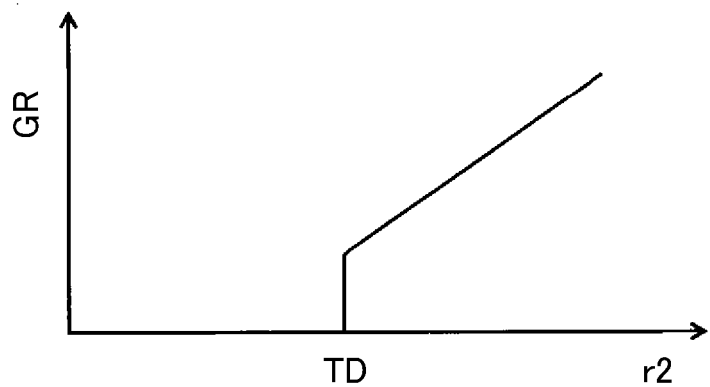

FIG.10
(a) 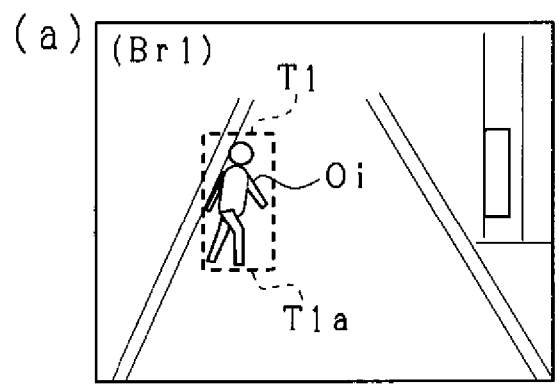
(b) 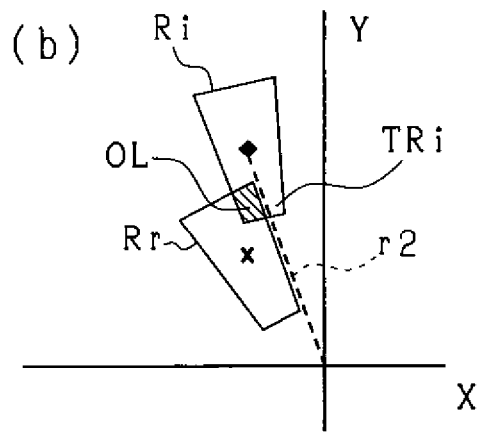
(c) 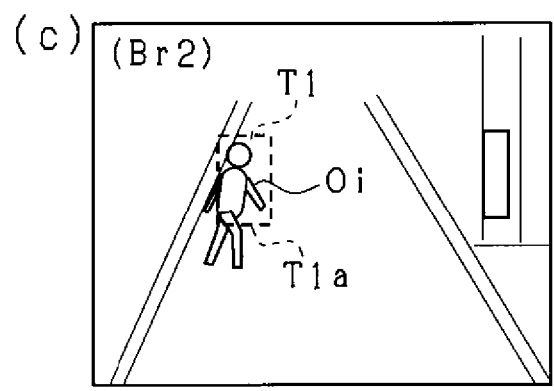
(d) 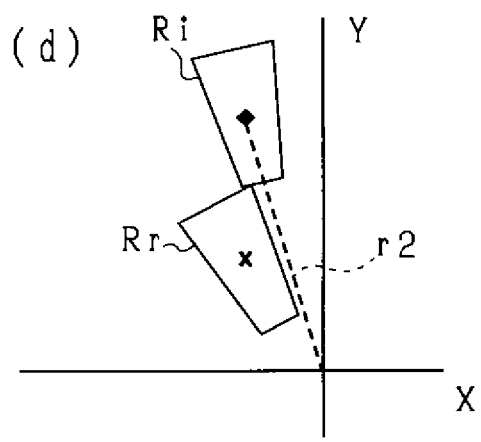
(e) 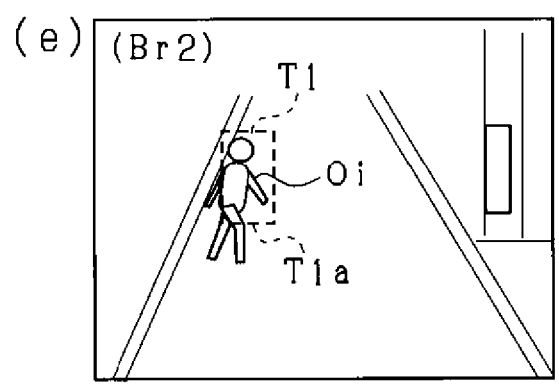
(f) 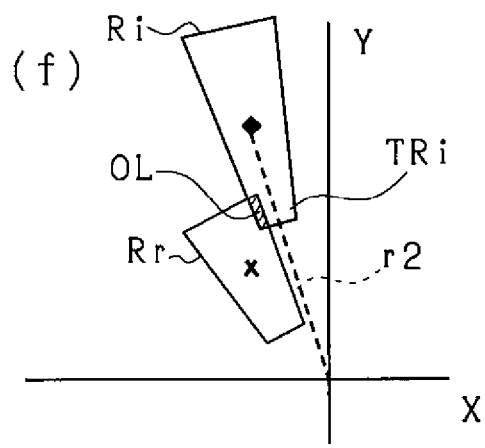

FIG.12
(a)
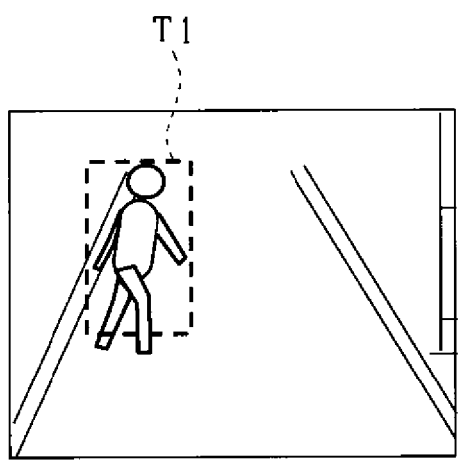
(b)
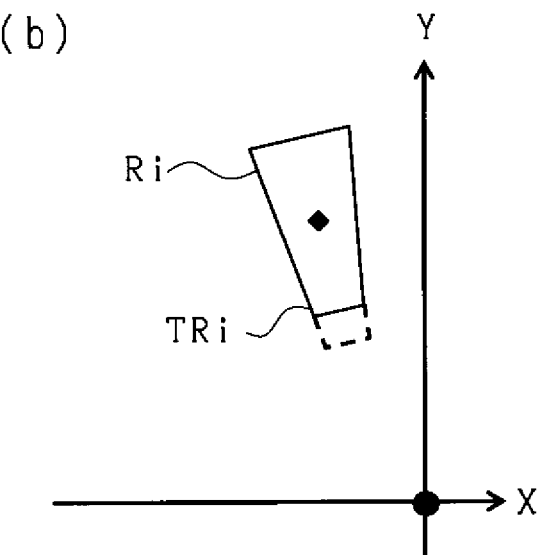
(c)
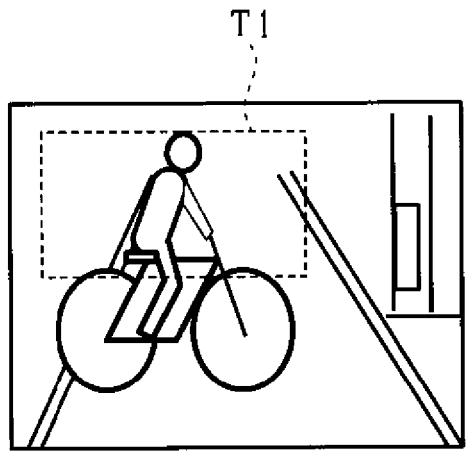
(d)
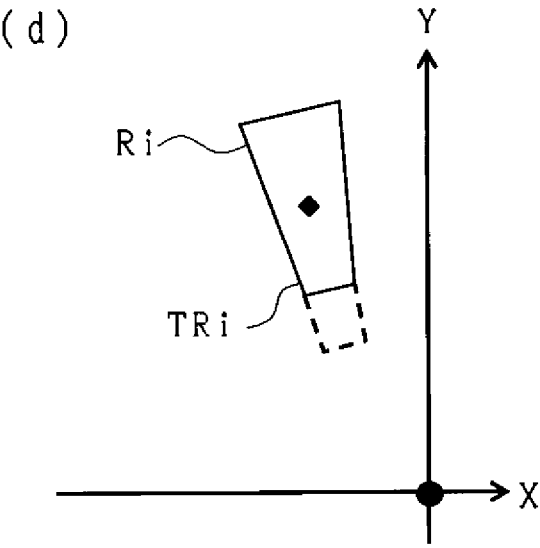

FIG.14
(a) 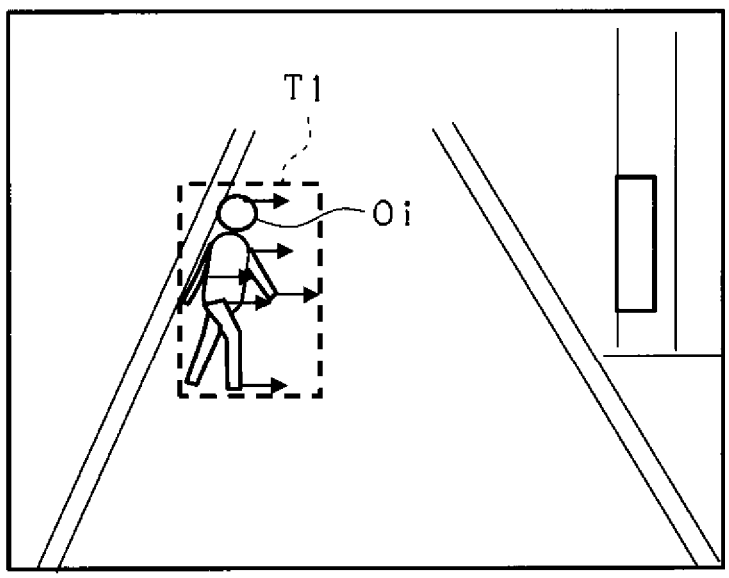
(b) 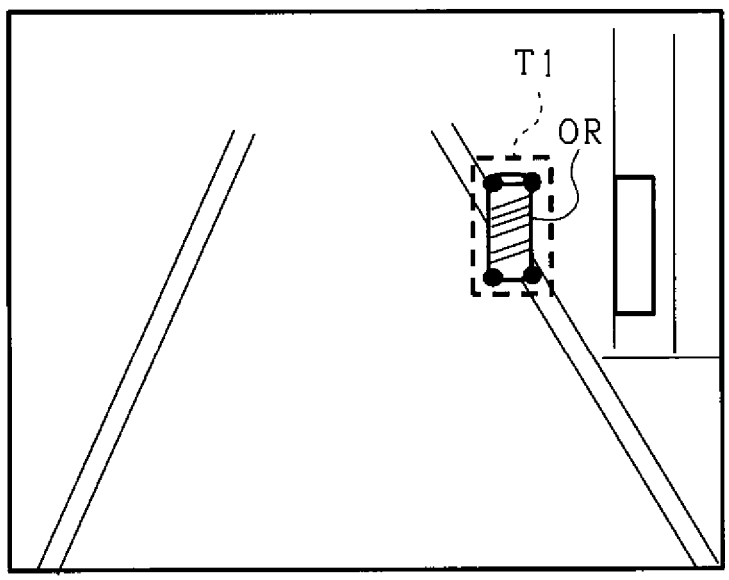

FIG.15
(a) 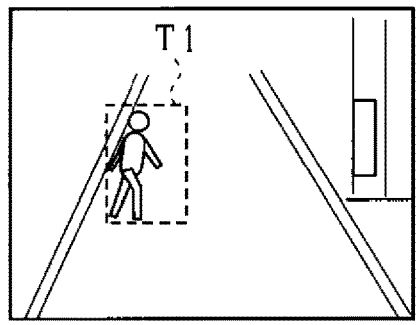
(b) 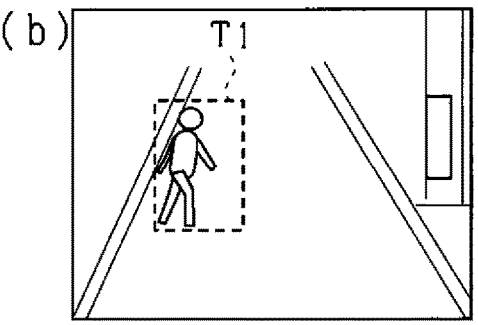
(c) 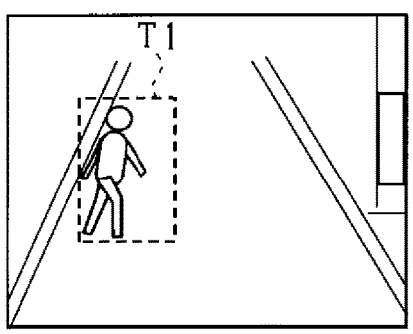
(d) 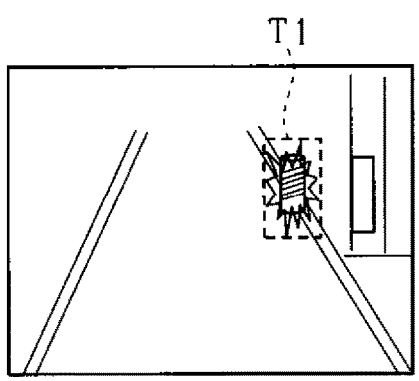
(e) 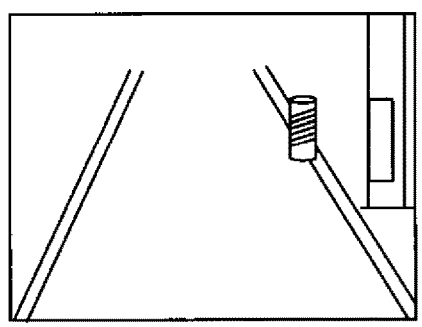
(f) 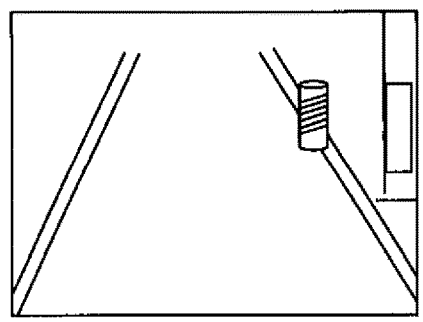

OBJECT DETECTION APPARATUS AND OBJECT DETECTION METHOD

CROSS-REFERENCE TO RELATED APPLICATION

The present application is a national stage application under 35 U.S.C. § 371(c) of PCT Application No. PCT/JP2017/015778, filed on Apr. 19, 2017, which is based on Japanese Patent Application No. 2016-086408 filed on Apr. 22, 2016, the description of which is incorporated herein by reference.

TECHNICAL FIELD

The present disclosure relates to an object detection apparatus and an object detection method for detecting an object by using a reflected wave sensor that transmits transmission waves and acquires the distance to the object on the basis of reflected waves corresponding to the transmission waves and a camera sensor that acquires a captured image.

BACKGROUND ART

PTL 1 discloses an object detection apparatus that detects an object by using a radar sensor and a camera sensor together. The object detection apparatus disclosed in PTL 1 sets a search region on the basis of a detection position of an object detected by the radar sensor, and sets a search region on the basis of the result of detecting an object by the camera sensor. The object detection apparatus then recognizes the object detected by the radar sensor and the object detected by the camera sensor as the same object if there is an overlapping region between the two search regions.

CITATION LIST

Patent Literature

[PTL 1] JP 2014-122873 A

SUMMARY OF THE INVENTION

In a case where the camera sensor detects an object, the accuracy in detecting an object may be reduced in accordance with ambient brightness. In this case, a search region can be incorrectly set on the basis of a detection result provided by the camera sensor, and the object detection apparatus can incorrectly recognize a single object as different objects when recognizing an object by using two search regions.

The present disclosure has been made in view of the above problems, and an object thereof is to provide an object detection to apparatus and an object detection method for preventing incorrect recognition of an object due to brightness of an area surrounding a vehicle.

The present disclosure provides an object detection apparatus that detects an object present around a vehicle by using a reflected wave sensor and a camera sensor, the reflected wave sensor being configured to transmit transmission waves and acquire a distance to the object based on reflected waves corresponding to the transmission waves, the camera sensor being configured to capture the object and acquire a captured image, the object detection apparatus including: a reflection region setting section that sets, with reference to a first position that is a detection position of the object detected by the reflected wave sensor; a region including the first position as a reflected wave search region; an image region setting section that sets, with reference to a second position that is a detection position of the object detected by the camera sensor, a region including the second position as an image search region; an object determination section that recognizes the object detected by the reflected wave sensor and the object detected by the camera sensor as the same object on condition that there is an overlapping region between the reflected wave search region and the image search region; and a brightness determination section that determines brightness in a direction in which the object is detected by the camera sensor, wherein the image region setting section changes a size of the image search region based on the determined brightness in the direction in which the object is detected.

An error may occur in the second position that is a detection position of the object detected by the camera sensor depending on ambient brightness. For example, the camera sensor may be unable to distinguish between an object and the background properly in a dark environment and may detect the object with its upper and lower ends removed. In such a case, the position of the object is not properly detected, causing an error in the second position. Due to the error in to the second position, the image search region that is with reference to the second position is set at an incorrect position. As a result, no overlapping region is provided between the image search region and the reflected wave search region, and the object determination section can incorrectly recognize a single object as different objects. In this regard, the present disclosure with the above configuration includes determining brightness in the direction in which the object is detected and changing the size of the image search region based on the determination result. For example, if the image search region is incorrectly set due to a dark environment around the vehicle, the size of the image search region is changed, whereby the formation of an overlapping region between the image search region and the reflected wave search region is facilitated, and incorrect determination by the object determination section associated with brightness can be prevented.

BRIEF DESCRIPTION OF DRAWINGS

The above and other objects, characteristics, and advantages of the present disclosure will be further clarified in the following detailed description with reference to the accompanying drawings, in which:

FIG. 8 is a diagram for describing a change in the image search region Ri;

FIG. 10 is a diagram for describing the image search region Ri whose region size is changed through a changing process;

FIG. 12 is a diagram for describing a relation between the type of an image target Oi and the amount of change in the image search region Ri;

FIG. 14 is a diagram for describing a relation between the image target Oi and the amount of movement; and FIG. 15 is a diagram for describing a relation between detection results provided by a camera sensor and objects.

DESCRIPTION OF EMBODIMENTS

Figure 1:
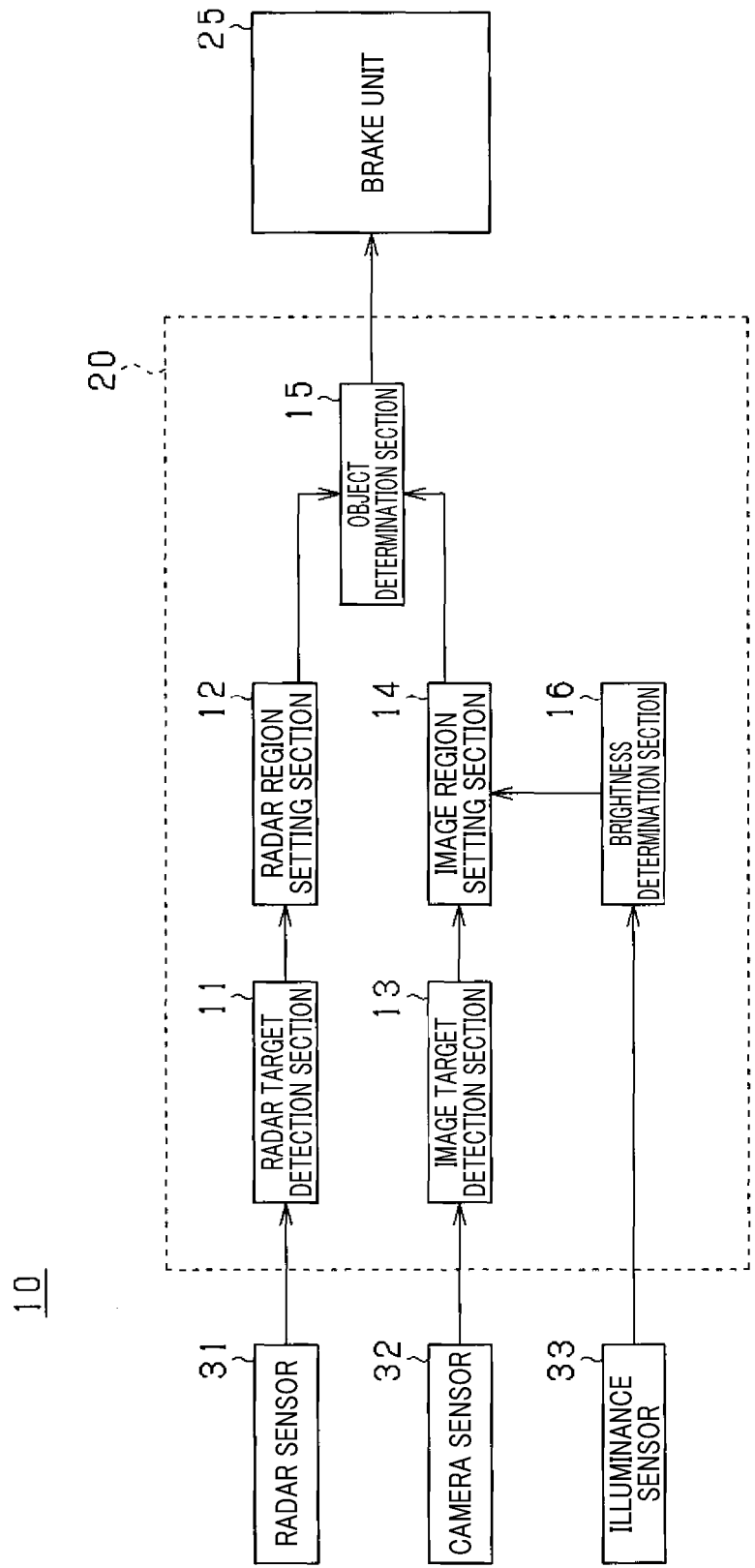
FIG. 1 is a configuration diagram illustrating a driving assist apparatus.

Hereinafter, embodiments of an object detection apparatus and an object detection method will be described with reference to the drawings. In the following description, the object detection apparatus is applied as a part of a driving assist apparatus that provides assistance in driving an own vehicle. In the following embodiments, components that are identical or equivalent to each other are denoted by the same reference sign in the drawings, and the description of a component is incorporated by reference in the description of another component denoted by the same reference sign.

First Embodiment

FIG. 1 is a configuration diagram illustrating a driving assist apparatus 10. The driving assist apparatus 10 is mounted in a vehicle to monitor the movement of an object located ahead of the vehicle. In the event that the vehicle is in danger of colliding with the object, the driving assist apparatus 10 avoids or mitigates the collision using automatic braking. As illustrated in FIG. 1, the driving assist apparatus 10 includes various sensors, an ECU 20, and a brake unit 25. In the embodiment illustrated in FIG. 1, the ECU 20 functions as an to object detection apparatus. Hereinafter, a vehicle equipped with the driving assist apparatus 10 is referred to as a vehicle CS. An object recognized by the driving assist apparatus 10 is referred to as a target Ob.

Various sensors are connected to the ECU 20 to output results of detecting objects to the ECU 20. In FIG. 1, sensors include a radar sensor 31, a camera sensor 32, and an illuminance sensor 33. The radar sensor 31 functions as a reflected wave sensor to detect the target Ob. The camera sensor 32 detects the target Ob on the basis of a captured image. The illuminance sensor 33 detects brightness. When a target Ob detected by the radar sensor 31 and a target Ob detected by the camera sensor 32 are distinguished from each other, a target detected by the radar sensor 31 is referred to as a radar target Or, and a target detected by the camera sensor 32 is referred to as an image target Oi.

The radar sensor 31 transmits directional transmission waves such as millimeter waves and radar, and receives reflected waves reflected by the radar target Or in response to the transmission waves. The radar sensor 31 then calculates, for example, a distance to, a bearing to, and a speed relative to the radar target Or in accordance with the reflected waves, and outputs a radar signal to the ECU 20.

The camera sensor 32 is disposed on the front side of the vehicle CS to recognize the image target Oi located ahead of the vehicle. The camera sensor 32 includes an imaging unit, a controller, and an ECU I/F. The imaging unit captures images of an area surrounding the vehicle. The controller performs well-known image processes on a captured image acquired by the imaging unit. The ECU I/F enables the controller and the ECU 20 to communicate with each other. Note that the camera sensor 32 may be a monocular camera or a stereo camera.

The camera sensor 32 identifies, as the image target Oi, an object detected through analysis of a captured image. For example, the camera sensor 32 performs a matching process using pre-registered dictionaries to identify the image target Oi. A dictionary is prepared for each kind of image target Oi, so that the type of the image target Oi is also specified. Examples of types of image targets Oi include automobiles having four or more wheels, two-wheel vehicles, pedestrians, obstructions such as guardrails, and the like. Note that two-wheel vehicles include bicycles, saddled motorcycles, and the like. In accordance with the recognized image target Oi, the camera sensor 32 outputs a detection result including positional information of the image target Oi. The positional information includes the positions of the center and two ends of the image target Oi in a captured image. For example, the positions of the two ends of the image target Oi indicate the coordinates of the two ends of a detection region indicating the region of the image target Oi recognized within the captured image.

The illuminance sensor 33 detects brightness in the imaging axis direction, i.e., the sensing direction of the camera sensor 32. The illuminance sensor 33 is disposed in the vehicle CS with its sensing unit oriented in the imaging axis direction. The illuminance sensor 33 includes the sensing unit that senses brightness, and outputs, to the ECU 20, a signal that is based on the sensing result provided by the sensing unit. The sensing unit is, for example, a photodiode.

The ECU 20 is configured as a well-known computer including a CPU, a ROM, a RAM, and the like. The CPU executes a program stored in the ROM to function as a radar target detection section 11, a radar region setting section 12 (reflection region setting section), an image target detection section 13, an image region setting section 14, an object determination section 15, and a brightness determination section 16.

Figure 2:
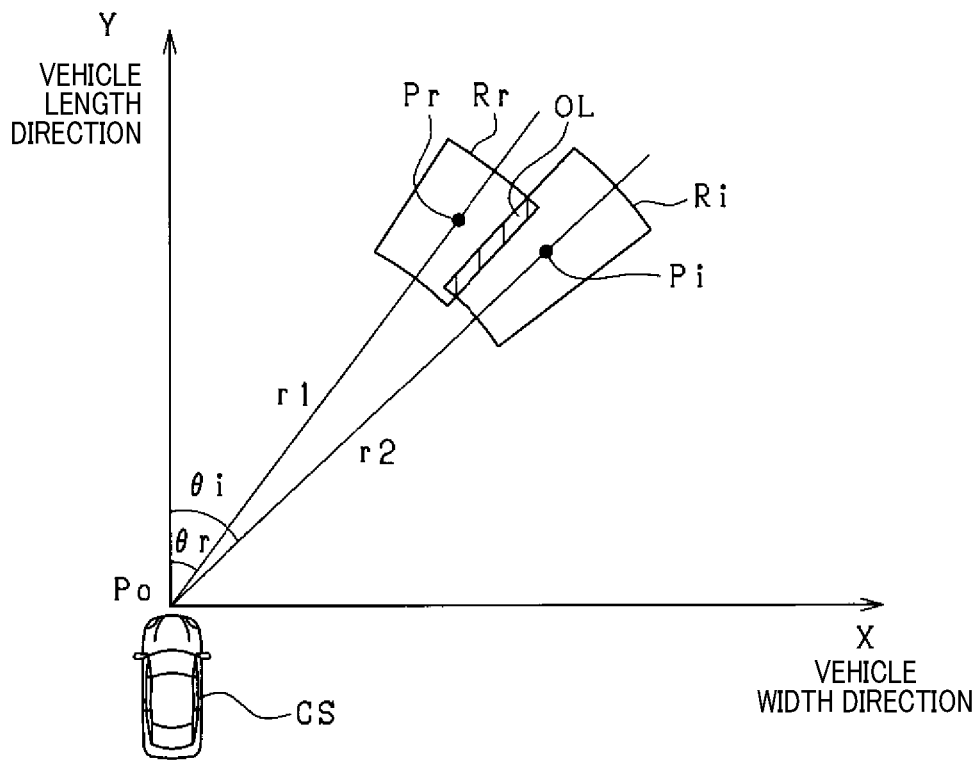
FIG. 2 is a diagram illustrating a radar search region and an image search region.

The radar target detection section 11 applies a detection result provided by the radar sensor 31 to the XY-plane illustrated in FIG. 2, thereby specifying the detection position (first position) of a radar target relative to the vehicle CS. Note that the XY-plane of FIG. 2 is set with the width direction (lateral direction) of the vehicle represented by the X-axis and the vehicle length direction (front direction) of the vehicle represented by the Y-axis. In the XY-plane, the front end position (position where the radar sensor 31 is provided) of the vehicle CS is set as a reference point Po, and the first position Pr of the radar target Or is represented as the position relative to the reference point Po. Note that the example of FIG. 2 indicates that the radar target Or is located ahead of the vehicle CS on the right side.

Figure 3:
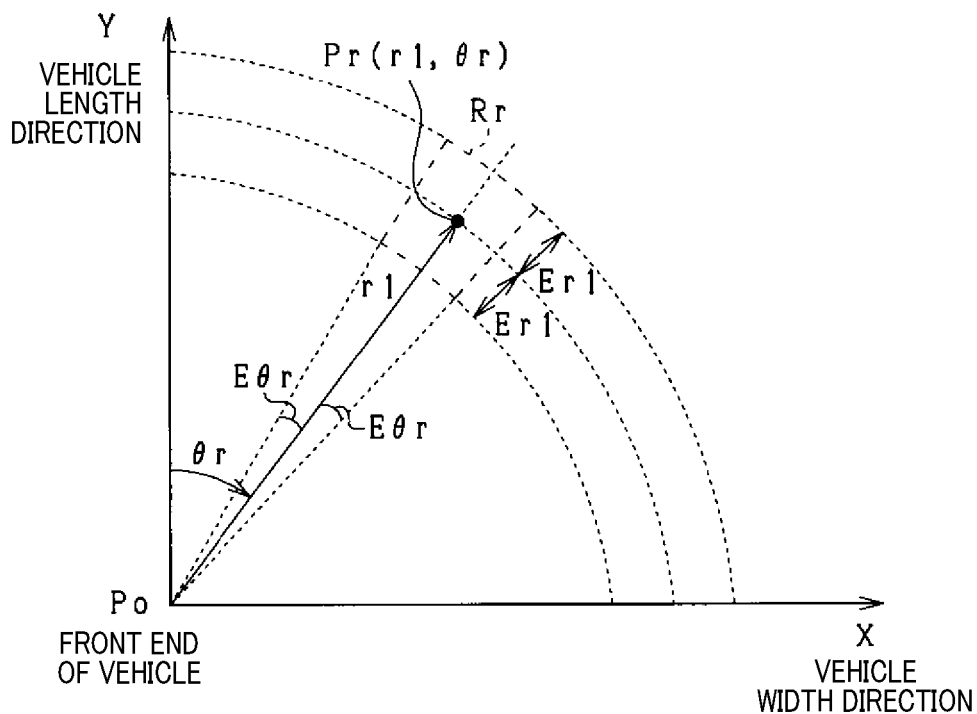
FIG. 3 is a diagram illustrating a radar search region.

The radar region setting section 12 sets a radar search region Rr (reflected wave search region) around the first position Pr of the radar target Or as illustrated in FIG. 2. Specifically, as illustrated in FIG. 3, with reference to a distance r1 from the reference point Po of the first position Pr and an angle θr in the circumferential direction from the Y-axis to the first position Pr, the radar region setting section 12 sets, as the radar search region Rr, the region having a width corresponding to the margin of an assumed error set in advance on the basis of the characteristics of the radar sensor 31 in each of the distance direction and the circumferential direction. Note that the circumferential direction can be defined as a direction orthogonal to the line connecting the reference point Po and the first position Pr.

For example, FIG. 3 illustrates an assumed error of ±=Er1 for the distance direction and an assumed error of ±Eθr for the angle in the circumferential direction with reference to the first position Pr (r1, θr). Therefore, the radar search region Rr extends from (r1−Er1) to (r1+Er1) with respect to the distance direction and from (θr−Eθr) to (θr+Eθr) with respect to the angle in the circumferential direction with reference to the first position Pr (r1, θr).

The image target detection section 13 applies the result of detecting the image target Oi by the camera sensor 32 to the XY-plane illustrated in FIG. 2, thereby specifying the detection position (second position) of the image target Oi relative to the vehicle CS. Note that the image target detection section 13 specifies the position of the image target Oi on the XY-plane on the basis of the vertical position of the image target Oi in the captured image.

Figure 4:
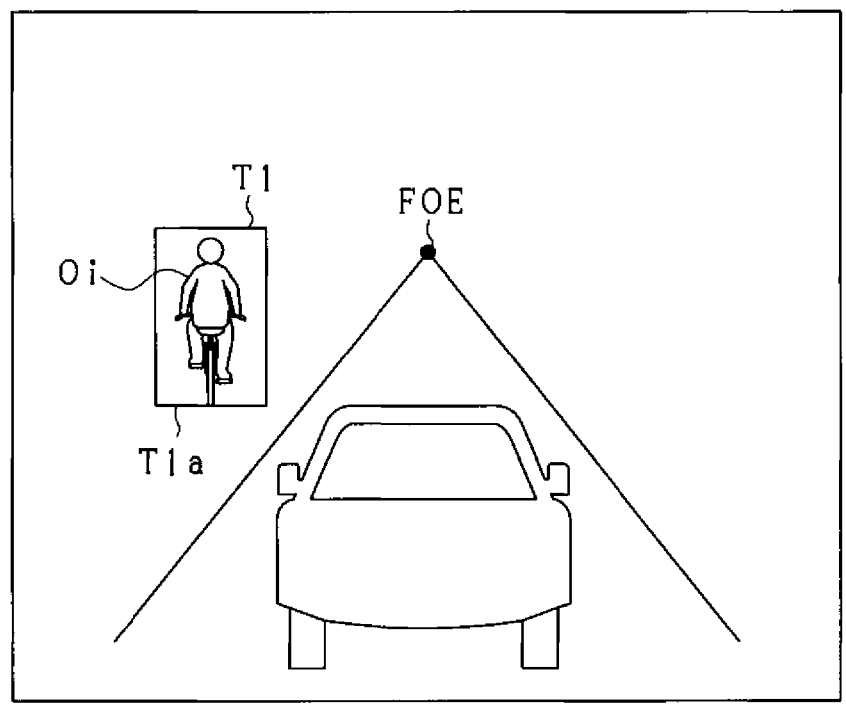
FIG. 4 is a diagram illustrating an exemplary photograph image.

Refer to an exemplary captured image illustrated in FIG. 4 for details. First, the image target detection section 13 performs a matching process with dictionaries to extract a detection region T1 for the image target Oi from the captured image. The image target detection section 13 then specifies the distance-directional position on the XY-plane from the vertical position (coordinates) of the extracted detection region T1 in the captured image. In this example, the image target detection section 13 specifies the distance-directional position on the XY-plane of FIG. 2 on the basis of the position of a ground point T1a of the image target Oi included in the detection region T1.

In the captured image, the closer the ground point T1a of the image target Oi is to a point at infinity FOE (focus of expansion), the farther the image target Oi is from the vehicle CS, that is, the greater the distance r2 to the target in the distance direction is on the XY-plane. Such a correlation is stored in advance, so that the distance r2 in the distance direction on the XY-plane of FIG. 2 can be specified from the ground point T1a of the image target Oi.

The image target detection section 13 also specifies an angle in the circumferential direction to the image target Oi (angular position with reference to the front direction of the vehicle) on the basis of the horizontal position of the image target Oi in the captured image. Specifically, the horizontal deviation of the image target Oi from the point at infinity FOE of the camera sensor 32 tends to increase as the angular deviation (inclination) of the image target Oi from the front direction of the vehicle (in particular, the line of X=0) increases. Therefore, the circumferential position of the image target Oi on the XY-plane of FIG. 2 can be specified on the basis of the distance from the point at infinity FOE to the vertical line passing through the center of the image target Oi in the captured image of FIG. 4.

The image region setting section 14 sets an image search region Ri around the second position Pi as illustrated in FIG. 2, Specifically, the image region setting section 14 sets, as the image search region Ri, the region having a width corresponding to the margin of an assumed error for the distance from the reference point Po (radius of a circle around the reference point Po) and having a width corresponding to the margin of an assumed error in the circumferential direction of the circle around the reference point Po.

Figure 5:
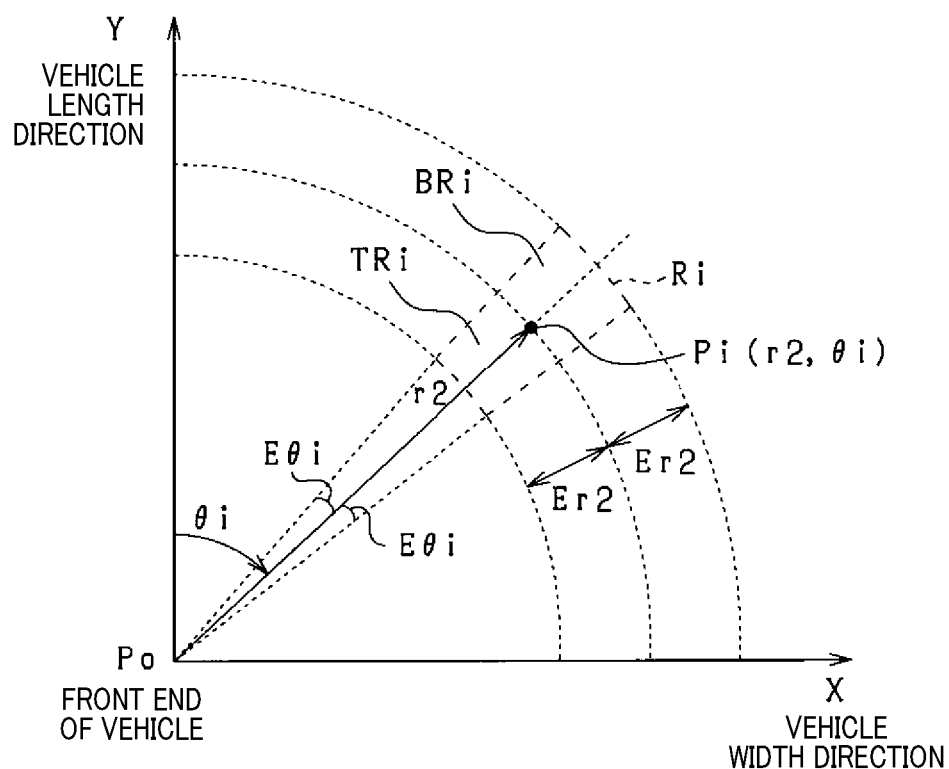
FIG. 5 is a diagram illustrating an image search region.

More specifically, as illustrated in FIG. 5, with reference to the second position Pi (r2, θi), the region having a width corresponding to the margin of an assumed error set in advance on the basis of the characteristics of the camera sensor 32 in each of the distance direction and the circumferential direction is set as the image search region Ri. In FIG. 5, an assumed error of ±Er2 for the distance direction and an assumed error of ±Eθi for the angle in the circumferential direction are set with reference to the second position Pi (r2, θi). Therefore, the image search region Ri extends from (r2−Er2) to (r2+Er2) with respect to the distance direction and from (θi−Eθi) to (θi+Eθi) with respect to the angle in the circumferential direction with reference to the second position Pi.

Hereinafter, in the image search region Ri, with reference to the second position Pi (r2, θi), the region extending from (r2−Er2) to (r2) in the distance direction is referred to as a near region TRi, and the region extending from (r2) to (r2+Er2) in the distance direction is referred to as a far region BRi. Note that Er2 is a variable that depends on the characteristics of the camera sensor 32.

If there is an overlapping region OL between the radar search region Rr and the image search region Ri as illustrated in FIG. 2, the object determination section 15 recognizes the radar target Or and the image target Oi as the same object. In this case, the object determination section 15 may set the position of the detected target using the first position Pr (r1, θr) obtained by the radar sensor 31 and the second position Pi (r2, θi) obtained by the camera sensor 32.

The camera sensor 32 may be unable to distinguish between the image target Oi and the background properly in a dark environment in the detection direction of the camera sensor 32, and may detect the image target Oi with its upper and lower ends removed. In this case, the acquired ground point T1a of the detection region T1 is above or below the actual lower end position of the image target Oi. In such a case, the distance r2 of the result of detection (r2, θi) by the camera sensor 32 will be incorrect. The incorrect detection of the distance r2 can cause the image search region Ri to be incorrectly set. Therefore, in the present embodiment, the image region setting section 14 changes the image search region Ri in accordance with the brightness in the detection direction of the camera sensor 32 to prevent incorrect setting of the image search region Ri associated with brightness.

The brightness determination section 16 determines the brightness in the detection direction of the camera sensor 32 on the basis of the output from the illuminance sensor 33. The determination result of the brightness of the area surrounding the vehicle by the brightness determination section 16 is output to the image region setting section 14.

The brake unit 25 functions as a brake device that decreases speed V of the vehicle CS. The brake unit 25 also automatically brakes the vehicle CS under the control of the ECU 20. The brake unit 25 includes, for example, a master cylinder, a wheel cylinder that applies braking force to the wheels, and an ABS actuator that adjusts distribution of pressure (hydraulic pressure) from the master cylinder to the wheel cylinder. The ABS actuator is connected to the ECU 20, and adjusts hydraulic pressure from the master cylinder to the wheel cylinder under the control of the ECU 20 to adjust the degree of braking of the wheels.

The ECU 20 determines whether collision avoidance control is required against the target Ob recognized as the same target Ob, and actuates the brake unit 25 in response to determining that collision avoidance control is required. For example, the ECU 20 calculates time to collision TTC for the target Ob recognized as the same target and the own vehicle. The time to collision TTC is an evaluation value indicating how many seconds are left before the vehicle collides with the target Ob assuming that the vehicle keeps traveling at a constant speed. The danger of a collision increases as TTC decreases, and the danger of a collision decreases as TTC increases. The time to collision TTC can be calculated, for example, by dividing the traveling-directional distance between the target Ob and the own vehicle by the speed relative to the target Ob. The speed relative to the target Ob is obtained by subtracting the speed of the own vehicle from the speed V of a preceding vehicle. Note that the time to collision TTC may be calculated in consideration of relative acceleration.

Then, if the time to collision TTC is equal to or less than the actuation time of an in-vehicle instrument, the brake unit 25 is actuated. For example, the actuation time of the brake unit 25 is set in accordance with the type of the target Ob. For example, since the danger of a collision with a two-wheel vehicle as the target Ob is higher than that with a pedestrian as the target Ob, the actuation time of the brake unit 25 in the case of a two-wheel vehicle is set earlier than for a pedestrian. Note that the driving assist apparatus 10 includes a speaker that outputs alarm sound and guidance sound, a seat belt, and the like as well as the brake unit 25, and also controls the actuation of the speaker and the seat belt in accordance with the result of determination by the ECU 20. Therefore, the ECU 20 also functions as a collision avoidance control section.

Figure 6:
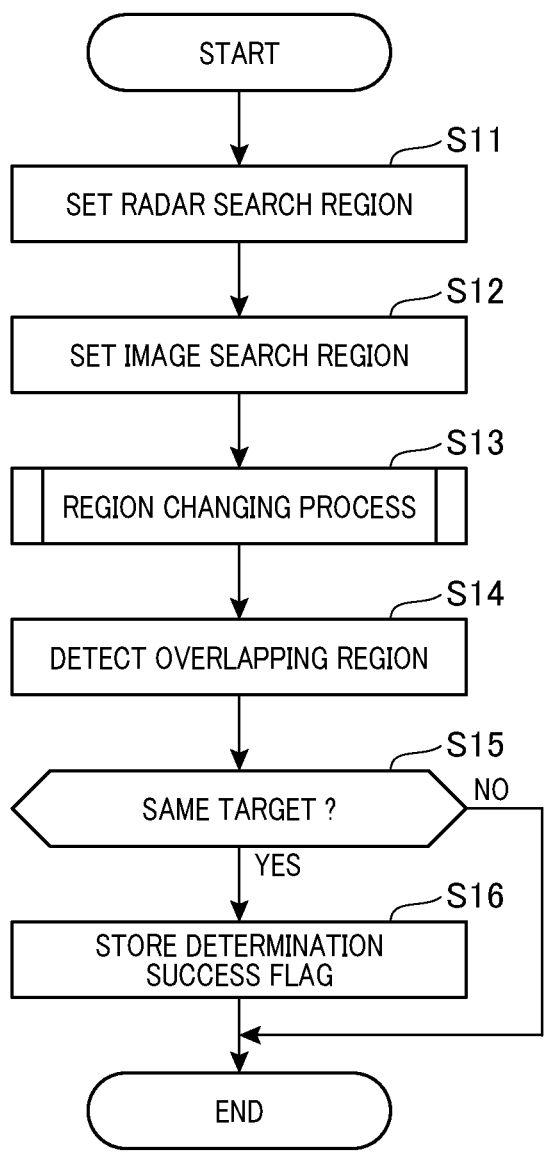
FIG. 6 is a flowchart of an object detection process by an object detection apparatus.

Next, an object detection process performed by the ECU 20 will be described with reference to FIG. 6. The process illustrated in FIG. 6 is performed by the ECU 20 at certain intervals.

In step S11, the radar search region Rr is set on the basis of the first position Pr. Next, the image search region Ri is set in step S12 on the basis of the second position Pi. Step S11 functions as a reflection region setting step. Step S12 functions as an image region setting step.

In step S13, a region changing process is performed for changing the image search region Ri. Note that step S13 will be described in detail later.

In step S14, the overlapping region OL between the radar search region Rr and the image search region Ri is detected. In step S15, it is determined whether the same object is detected on the basis of the radar target Or and the image target Oi. In other words, it is determined whether the radar target Or and the image target Oi are the same target. If the overlapping region OL between the radar search region Rr and the image search region Ri is not detected, or if the overlapping region is detected but the distance to the radar target is greater than a threshold value, the targets Ob are not regarded as the same target (step S15: NO). Then, the process illustrated in FIG. 6 is halted. Steps S14 and S15 function as an object determination step.

Note that the threshold value for determining the distance to the radar target Or can vary depending on the type of target and ambient brightness. For example, the threshold value in bright environments is greater than the threshold value in dark environments. In dark environments, the image detectable distance is reduced. Therefore, if an image target is fused with the radar target Or located some distance away, it is determined that these targets are unlikely to be the same.

In contrast, if the overlapping region OL between the radar search region Rr and the image search region Ri is detected, it is determined that the detection of the target Ob has succeeded (step S15: YES). In step S16, a determination success flag is stored. The determination success flag is a flag indicating that the same target Ob has been detected in the radar search region Rr and the image search region Ri in the current process. The ECU 20 halts the process of FIG. 6 after step S16 is finished.

Next, the process of changing the image search region Ri performed in step S13 of FIG. 6 will be described with reference to FIG. 7. In the process of changing the image search region Ri illustrated in FIG. 7, the ECU 20 changes the region size of the image search region Ri depending on the brightness of the area in front of the vehicle.

In step S20, it is determined whether the area in front of the vehicle in the detection direction of the camera sensor 32 is bright or dark. The brightness determination section 16 determines the brightness of the area in front of the vehicle on the basis of the output from the illuminance sensor 33.

If the area in the detection direction is bright (step S20: NO), it can be determined that the detection accuracy of the camera sensor 32 is high. Therefore, the process of FIG. 7 is finished without changing the size of the image search region Ri.

In contrast, if the area in the detection direction is dark (step S20: YES), it is determined in step S21 whether the same target is detected. For example, if the determination success flag has been recorded, it is determined that the same target is detected. If the same target is detected (step S21: YES), the current method of setting the image search region Ri is maintained in step S22. In this case, since the target Ob has been detected using the image search region Ri defined with the current setting method, the process proceeds to step S28 without changing the setting method. Note that the setting method means the procedure that is performed in step S24, S26, or S27 described later.

In contrast, if the same target Ob is not detected (step S21: NO), it is determined in step S23 whether headlights of the vehicle CS are on or off. If the headlights are off (step S23: YES), the process proceeds to step S24, and the size of the image search region Ri is changed depending on the brightness of the area surrounding the vehicle (region expanding process 1).

In the example in FIG. 8(a), the value of the amount of expansion of the image search region Ri is set such that the amount of expansion increases as brightness decreases. For example, the ECU 20 stores a map indicating a relation between brightness and the amount of expansion illustrated in FIG. 8(a). Therefore, the image region setting section 14 refers to the map to set the amount of expansion of the image search region Ri. In FIG. 8(b), the near region TRi and the far region BRi are changed by the same amount of expansion. Alternatively, the amount of expansion of the near region TRi may be larger than the amount of expansion of the far region BRi. To the contrary, the amount of expansion of the far region BRi may be larger than the amount of expansion of the near region TRi.

In step S28, a guard region GR is set for the expanded region. The guard region GR is a region where whether there is the overlapping region OL between the image search region Ri and the radar search region Rr is not determined in step S14 of FIG. 6. For example, in FIG. 8(b), the guard region GR is set on the distance-directional rear end side of the expanded far region BRi of the image search region Ri. Since the detection accuracy of the camera sensor 32 varies depending on the distance r2 to the image target Oi as well, if the distance r2 is equal to or greater than a threshold value TD, the guard region GR is set so that incorrect recognition of the image target Oi associated with the expansion of the image search region Ri does not increase.

FIG. 8(c) illustrates a relation between the distance r2 and the guard region GR as an example. The guard region GR is not set if the distance r2 is equal to or less than the threshold value TD, that is, a boundary. If the distance r2 is equal to or greater than the threshold value TD, the guard region GR is set such that a ratio of the guard region GR to the changed region increases as the distance r2 increases. For example, if the distance r2 is equal to or greater than the threshold value TD, the guard region GR expands from the distance-directional rear end of the changed far region BRi toward the near region TRi as the distance r2 increases.

Figure 9:
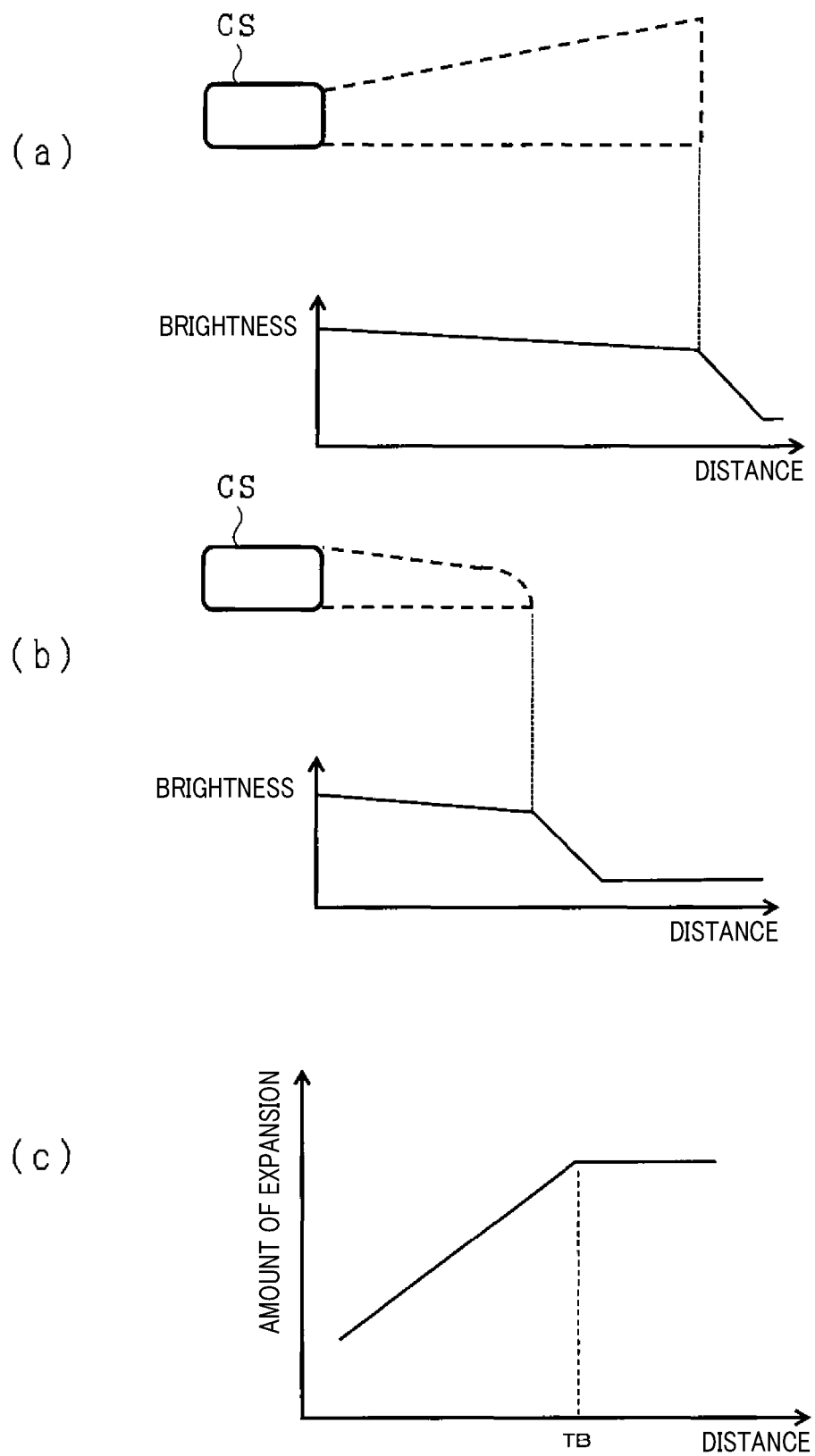
FIG. 9 is a diagram for describing a change in the image search region Ri.

Returning to step S23, if the headlights are on (step S23: NO), it is determined in step S25 whether low beam is being used or high beam is being used. This is because brightness in the detection direction of the camera sensor 32 varies depending on whether high beam is used or low beam is used. As illustrated in FIG. 9(a), high beam is used to illuminate an area extending far from the vehicle CS. Therefore, the detection accuracy of the camera sensor 32 is kept at a high level over a long distance. In contrast, as illustrated in FIG. 9(b), low beam is used to illuminate a shorter area in front of the vehicle than high beam. Therefore, the detection accuracy of the camera sensor 32 decreases as the distance increases.

If low beam is used (step S25: YES), a process of expanding the image search region Ri for the use of low beam is performed in step S26 (region expanding process 2). In step S26, the amount of expansion of the image search region Ri is changed depending on the distance to the image target Oi. If the distance from the camera sensor 32 to the image target Oi increases during the use of low beam, the brightness of the area surrounding the image target Oi decreases, causing reduction in the detection accuracy of the camera sensor 32. Therefore, in the example of FIG. 9(c), the value of the amount of expansion of the image search region Ri is set such that the amount of expansion increases as the distance r2 from the camera sensor 32 to the second position Pi of the image target Oi increases. In FIG. 9(c), if the distance r2 exceeds a threshold value TB, the region is not expanded any further since the detection accuracy of the camera sensor 32 is extremely reduced. Note that in the present embodiment, the near region TRi and the far region BRi are expanded by the same amount of expansion. Alternatively, the amount of expansion of the far region BRi may be larger than the amount of expansion of the near region TRi.

In contrast, if high beam is used (step S25: NO), a process of expanding the image search region Ri for the use of high beam is performed in step S27 (region expanding process 3). In step S27, the amount of expansion of the image search region Ri is changed depending on the distance to the image target Oi. In the case of using high beam, the distance r2 from the vehicle CS at which the detection accuracy of the camera sensor 32 is extremely reduced is large as compared with the case of using low beam. Therefore, the threshold value TB is more distant from the vehicle CS than that illustrated in FIG. 9(c).

Figure 7:
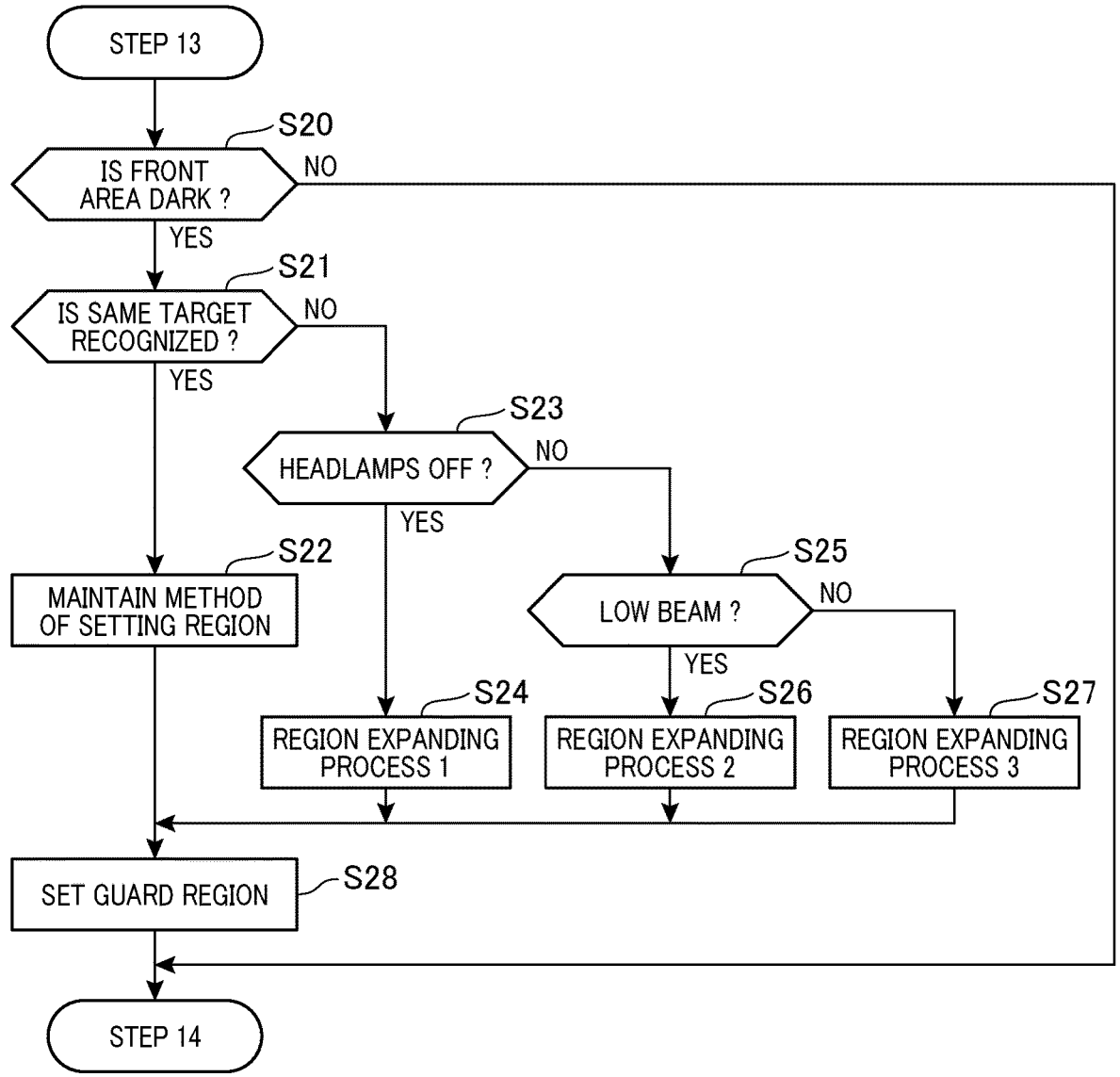
FIG. 7 is a flowchart for describing a change in an image search region Ri.

Then, after the guard region is set in S28, the process of FIG. 7 is finished, and the object detection process proceeds to step S14 of FIG. 6.

Next, the image search region Ri whose region size is changed through the changing process will be described with reference to FIG. 10. FIGS. 10(a) and 10(b) illustrate exemplary cases where the brightness of the area surrounding the vehicle is Br1, and FIGS. 10(c) to 10(f) illustrate exemplary cases where the brightness of the area surrounding the vehicle is Br2. Note that FIGS. 10(c) and 10(d) are comparative examples indicating the image search region Ri and the radar search region Rr that do not undergo the region changing process in step S14 of FIG. 6. Note that brightness Br1 and brightness Br2 in FIG. 10 satisfy a relation of Br1>Br2.

In a case where the brightness of the area surrounding the vehicle is Br1, as illustrated in FIG. 10(a), the camera sensor 32 properly distinguishes between the image target Oi and the background in the captured image, and the distance r2 to the image target Oi is properly detected. Therefore, as illustrated in FIG. 10(b), the image search region Ri is properly set on the basis of the detection result provided by the camera sensor 32. In this example, the overlapping region OL is formed between the near region TRi of the image search region Ri and the radar search region Rr, and it is determined that the camera sensor 32 and the radar sensor 31 are detecting the same target.

In a case where the brightness of the area surrounding the vehicle is Br2, as illustrated in FIG. 10(c), the camera sensor 32 cannot properly distinguish between the image target Oi and the background in the captured image, and the ground point T1a of the detection region T1 is set higher than that illustrated in FIG. 10(a) in the height direction. Therefore, as illustrated in FIG. 10(d), the second position Pi is set higher than that in FIG. 10(b) in the vehicle length direction Y, and the near region TRi of the image search region Ri with reference to the second position Pi is set higher than that in FIG. 10(b) in the vehicle length direction Y. Therefore, the overlapping region OL is not formed between the image search region Ri and the radar search region Rr, and it is determined that the camera sensor 32 and the radar sensor 31 are not detecting the same image target Oi.

In FIG. 10(e), the camera sensor 32 cannot properly distinguish between the image target Oi and the background in the captured image as in FIG. 10(c), and the second position Pi is set higher than that in FIG. 10(b) in the vehicle length direction Y. However, in FIG. 10(f), the near region TRi is expanded downward in the vehicle length direction Y compared with that in FIG. 10(d) depending on the brightness of the area surrounding the vehicle, and the overlapping region OL is formed between the image search region Ri and the radar search region Rr. As a result, it is determined that the camera sensor 32 and the radar sensor 31 are detecting the same image target Oi.

As described above, in the first embodiment, the ECU 20 detects the brightness in the detection direction of the camera sensor 32, and changes the image search region Ri in accordance with the determination result. For example, even when the image search region Ri is not properly set due to a dark environment in the detection direction, changing the image search region Ri facilitates the formation of the overlapping region OL between the image search region Ri and the radar search region Rr. As a result, incorrect determination by the object determination section 15 associated with brightness can be prevented.

The image region setting section 14 sets the amount of change for changing the size of the image search region Ri on the basis of the distance from the camera sensor 32 to the second position Pi.

The detection accuracy of the camera sensor 32 varies depending on the distance to the image target Oi to be detected as well. Therefore, in the case of changing the image search region Ri, the amount of change is set on the basis of the distance from the camera sensor 32 to the second position Pi, whereby an increase in incorrect recognition of the image target Oi associated with the expansion of the image search region Ri can be prevented.

The image region setting section 14 sets the amount of change for changing the size of the image search region Ri on the basis of the vertical orientation of the optical axis of the headlights of the vehicle CS. The distance range within which targets are illuminated varies depending on the orientation of the optical axis of the headlights. Therefore, in the above configuration, the amount of change in the size the image search region Ri is set on the basis of the vertical orientation of the optical axis, whereby incorrect recognition of the image target Oi can be prevented.

After the object determination section 15 recognizes the targets Ob as the same target Ob, the image region setting section 14 maintains the size of the image search region Ri even when the result of determination by the brightness determination section 16 is changed. The above configuration can avoid a situation where a change in ambient brightness after the recognition of the target Ob makes the objects unrecognizable as the same target Ob.

In response to recognizing the targets detected using the changed image search region Ri and the radar search region Rr as the same target, the ECU 20 performs collision avoidance control for avoiding a collision with the target. Here, the ECU 20 expands the image search region Ri on the basis of brightness, which increases the overlapping region OL between the image search region Ri and the radar search region Rr, resulting in the facilitation of the activation of operation in the collision avoidance control. Therefore, the ECU 20 facilitates the activation of operation in the collision avoidance control by expanding the image search region Ri on the basis of the brightness in the direction in which the recognized target Ob is detected.

Second Embodiment

Figure 11:
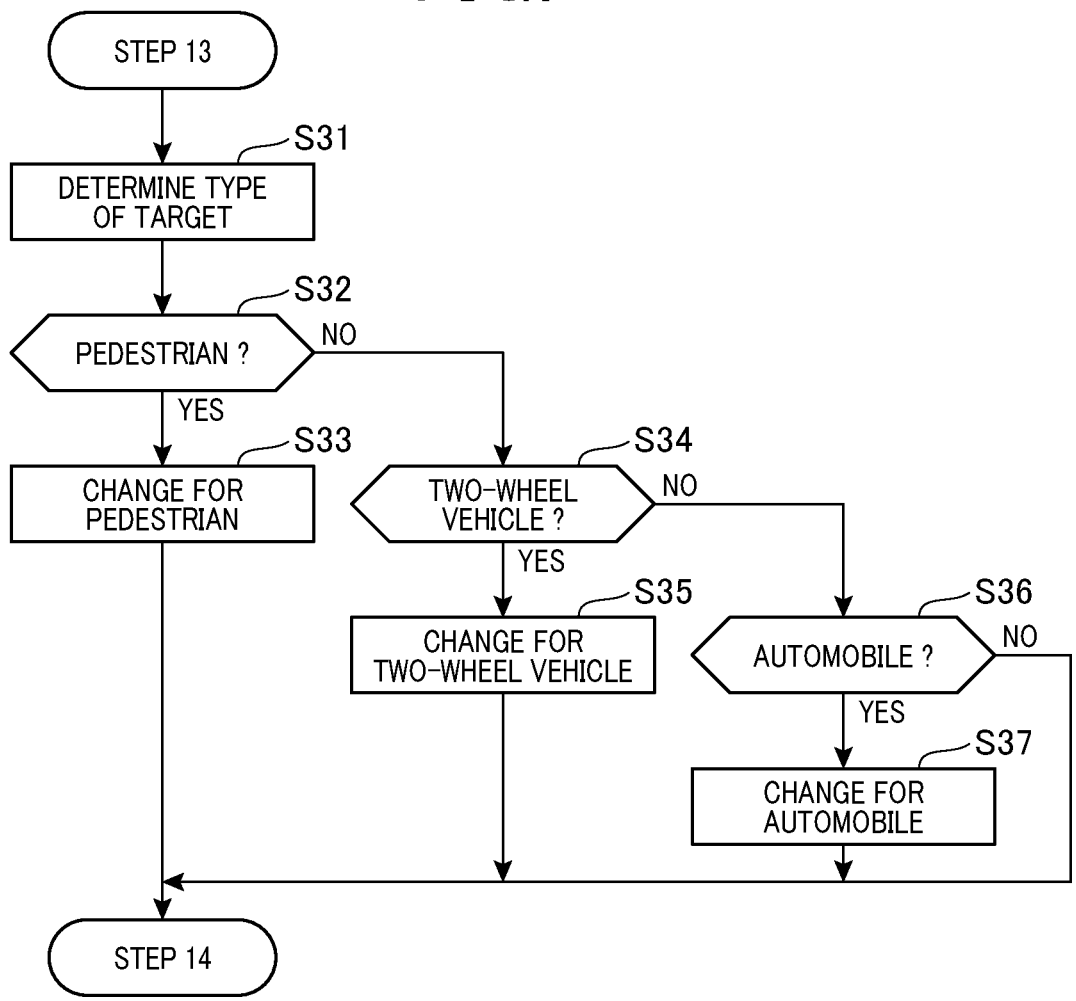
FIG. 11 is a flowchart for describing a change in the image search region Ri.

The ECU 20 may set the amount of change for changing the image search region Ri depending on the type of the image target Oi. FIG. 11 is a flowchart for describing a change in the size of the image search region Ri according to the second embodiment. The flowchart illustrated in FIG. 11 is a procedure that is performed by the ECU 20 in step S13 of FIG. 6.

In the second embodiment, the camera sensor 32 distinguishes between automobiles having four or more wheels, two-wheel vehicles, and pedestrians when detecting the image targets Oi. As illustrated in FIG. 11, the ECU 20 changes the image search region Ri depending on the distance r2 to and type (two-wheel vehicle, pedestrian, or automobile) of the image target Oi.

In step S31, the type of the image target Oi is determined. In the present embodiment, the type of the image target Oi is determined on the basis of the type of the image target Oi output from the camera sensor 32. Step S31 functions as a type determination section.

If the type of the image target Oi is a pedestrian (step S32: YES), a changing process adapted to a pedestrian is performed in step S33. In the changing process of step S33, the amount of change in the size of the image search region Ri is set on the basis of a relation between the brightness of the area surrounding the vehicle and the type of the image target Oi.

The relation between the type of the image target Oi and the amount of change in the image search region Ri is described with reference to FIG. 12. As illustrated in FIG. 12(a), the camera sensor 32 detecting a pedestrian may not recognize the lower end thereof. In this case, as illustrated in FIG. 12(b), only the size of the near region TRi of the image search region Ri is expanded so that the unrecognized lower end of the image target Oi is covered. The amount of expansion in the size of the near region TRi is set on the basis of the result of determination of brightness provided by the brightness determination section 16.

If the type of the image target Oi is not a pedestrian (step S32: NO) but a two-wheel vehicle (step S34: YES), a changing process adapted to a two-wheel vehicle is performed in step S35. In the changing process of step S35, the amount of change in the image search region Ri is set on the basis of the relation between the brightness of the area surrounding the vehicle and the type of the is image target Oi.

As illustrated in FIG. 12(c), the camera sensor 32 detecting a two-wheel vehicle may recognize only a rider on the upper side and not recognize the vehicle CS on the lower side. In this case, as illustrated in FIG. 12(d), the amount of expansion of the near region TRi is set greater than that illustrated in FIG. 12(b) so that the unrecognized lower part of the image target Oi is covered. The amount of expansion in the size of the near region TRi is set on the basis of the result of determination of brightness provided by the brightness determination section 16.

In step S34, if the image target Oi is not a two-wheel vehicle (step S34: NO) but an automobile (step S36: YES), a changing process adapted to an automobile is performed in step S37. In the changing process of step S37, the amount of change in the image search region Ri is set on the basis of the relation between the brightness of the area surrounding the vehicle and the type of the image target Oi.

If the image target Oi is not an automobile (step S36: NO), the process illustrated in FIG. 11 is finished without changing the size of the image search region Ri.

As described above, in the second embodiment, the ECU 20 determines the type of the image target Oi, and sets the amount of change for changing the size of the image search region Ri on the basis of the determined type. Since different types of image targets Oi have different characteristics, different regions of the image targets Oi are incorrectly detected by the camera sensor 32. The difference between the incorrectly detected regions of the image targets Oi causes a difference in the second position Pi and further causes a difference in the setting of the image search region Ri. Therefore, the amount of change in the size of the image search region Ri is set depending on the type of the image target Oi using the above configuration, whereby the image search region Ri can be properly set depending on the type of the image target Oi.

If the area in the detection direction of the camera sensor 32 is dark, an automobile having four or more wheels turns on the headlights and tail lamps to illuminate the area surrounding the image target Oi, which increases the detection accuracy of the camera sensor 32. In contrast, a pedestrian or two-wheel vehicle's operation of turning on a light or the like increases the brightness of the image target Oi only to a slight extent compared with an automobile having four or more wheels, and does not contribute to preventing reduction in detection accuracy. Therefore, the ECU 20 distinguishes between automobiles having four or more wheels, two-wheel vehicles, and pedestrians when detecting image targets Oi, and changes the size of the image search region Ri on the basis of the type of the image target Oi.

Third Embodiment

The ECU 20 may determine whether the target Ob detected by the camera sensor 32 is a target object targeted for changing the image search region Ri or a non-target object, and may set the amount of change for changing the image search region Ri on the basis of the determination result.

Figure 13:
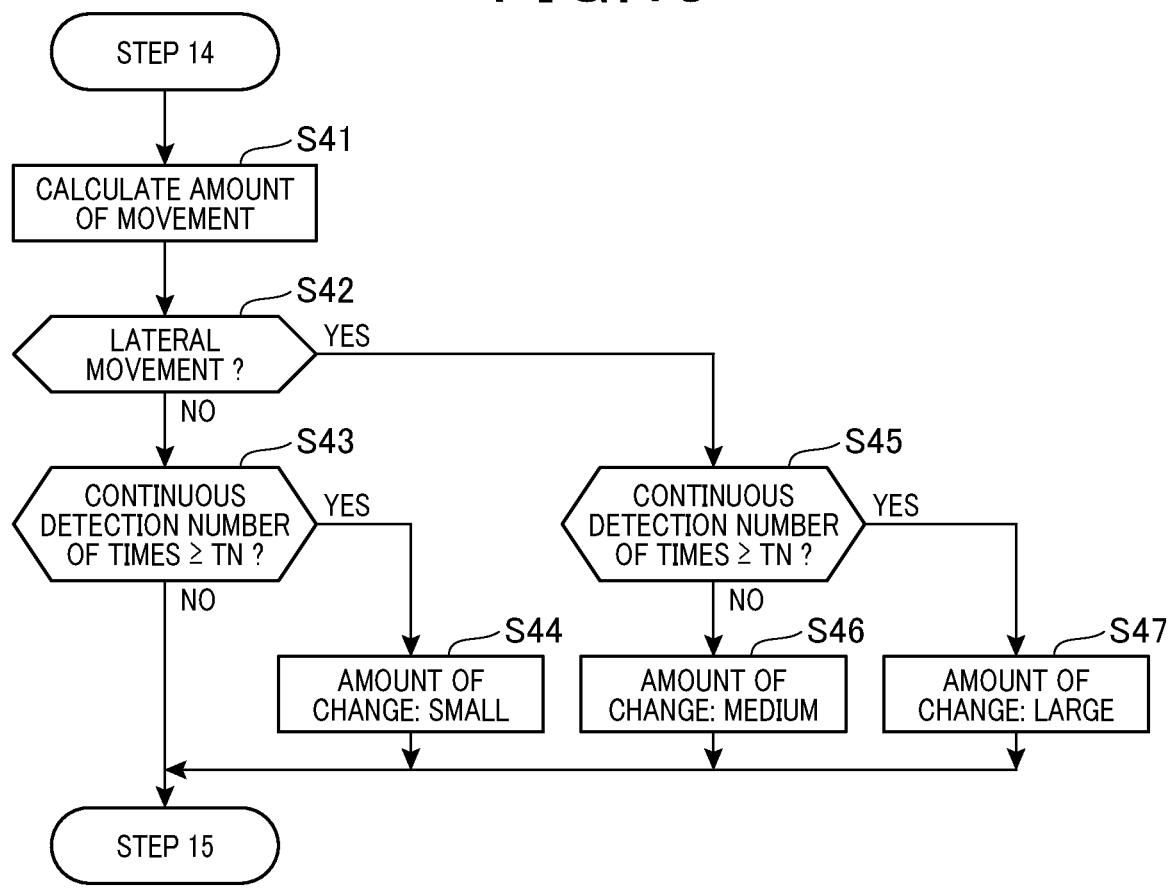
FIG. 13 is a flowchart for describing a change in the image search region Ri.

FIG. 13 is a flowchart for describing a change in the image search region Ri according to the third embodiment. The flowchart illustrated in FIG. 13 is the procedure that is performed by the ECU 20 in step S14 of FIG. 6. In the example illustrated in FIG. 13, the ECU 20 changes the image search region Ri if the image target Oi is a pedestrian or a two-wheel vehicle, and does not change the image search region Ri if the image target Oi is another object (non-target object).

In step S41, the amount of movement of the image target Oi is calculated while the camera sensor 32 is detecting the image target Oi. For example, a movement vector is calculated from temporal changes of the second position Pi, and the movement vector is used as the amount of movement. As used herein, the movement vector indicates the amount of variation and direction of each pixel of the image target Oi per unit time. In a case where the image target Oi is detected using a well-known optical flow method, the amount of movement may be calculated using this optical flow method.

FIG. 14 is a diagram for describing a relation between the image target Oi and the amount of movement. As illustrated in FIG. 14(a), if the image target Oi is a pedestrian or a two-wheel vehicle, the image target Oi moves in the vehicle width direction X as time advances. Therefore, if the image target Oi is a pedestrian or a two-wheel vehicle, the amount of movement in a certain period of time is equal to or greater than a predetermined value. In contrast, as illustrated in FIG. 13(b), if a stationary object RO is detected, the stationary object RO does not move in the vehicle width direction X as time advances. Therefore, if the image target Oi is a stationary object, the amount of movement in a certain period of time is less than a predetermined value. Thus, the amount of movement of the image target Oi in the vehicle width direction X is compared with a threshold value TA, so that the probability that the camera sensor 32 is detecting a stationary object as the image target Oi to be detected can be determined.

Returning to FIG. 13, if the image target Oi is moving in the lateral direction with respect to the vehicle CS (step S42: YES), how often the image target Oi is detected is determined in step S45. In the present embodiment, the image region setting section 14 determines how often the image target Oi is detected using a to continuous detection number of times N, i.e., how many times the image target Oi is continuously detected in a predetermined time period.

FIG. 15 is a diagram for explaining a relation between detection results provided by the camera sensor 32 and objects. FIGS. 15(a), 15(b), and 15(c) illustrate temporal changes of an object included in captured images. If the image target Oi is a pedestrian, the camera sensor 32 frequently detects the image target Oi. Therefore, the continuous detection number of times N of the camera sensor 32 in a predetermined time period is large.

FIGS. 15(d), 15(e), and 15(f) illustrate temporal changes of an object included in captured images. Suppose a pylon or the like is illuminated with the headlights, and the camera sensor 32 incorrectly detects a pedestrian or the like from light reflected by the pattern of the pylon. In this case, since the form of reflected waves from the pylon is temporary, the image target Oi is detected less frequently. Therefore, the continuous detection number of times N of the camera sensor 32 in a predetermined time period is small. Thus, the continuous detection number of times N indicating how many times the image target Oi is continuously detected by the camera sensor 32 in a predetermined time period is compared with a threshold value TN, whereby a probability that the camera sensor 32 is detecting a non-target object can be determined. Note that the threshold value TN for determining the continuous detection number of times N may be a fixed value or a variable that depends on the type of the image target Oi.

If the continuous detection number of times N is equal to or greater than the threshold value TN (step S45: YES), in step S47, the amount of change in the image search region Ri is set within the largest range of amounts, and the image search region Ri is changed. In this case, the image target Oi is moving in the lateral direction (vehicle width direction X), and the continuous detection number of times N is large. Therefore, it is determined that the probability that the camera sensor 32 is detecting a non-target object is lowest. Thus, the range of amounts of change in the image search region Ri set in step S47 is the largest of all the ranges in steps S44, S46, and S47. Note that in steps S44, S46, and S47, while the amount of change in the size of the image search region Ri is set depending on the brightness in the detection direction, different ranges of amounts of change (maximum and minimum values) are used in different steps.

In step S45, if the continuous detection number of times N is less than the threshold value TA (step S45: NO), in step S46, the amount of change in the image search region Ri is set within a medium range of amounts, and the image search region Ri is changed. In this case, the image target Oi is moving in the lateral direction, but the continuous detection number of times N is small. Therefore, it is determined that the probability that the camera sensor 32 is detecting a non-target object is low but still higher than that in step S47. Thus, the range of amounts of change in the image search region Ri set by the image region setting section 14 in step S46 is larger than that in step S44 and smaller than that in step S47.

In contrast, in step S42, if the moving direction of the image target Oi is not the lateral direction with respect to the vehicle CS (step S42: NO), the continuous detection number of times N of the image target Oi is determined in step S43. If the number of times that the image target Oi is detected is equal to or greater than the threshold value TN (step S43: YES), in step S44, the amount of change in the size of the image search region Ri is set within a small range of amounts, and the image search region Ri is changed. In this case, the image target Oi is not moving in the lateral direction, but the continuous detection number of times N is large. Therefore, it is determined that the probability that a non-target object is being detected is higher than those in steps S46 and S47. Thus, the range of amounts of change in the image search region Ri set by the image region setting section 14 in step S44 is the smallest of all the ranges in steps S44, S46, and S47.

If the number of times that the image target Oi is detected is less than the threshold value TN (step S43: NO), the process is finished without changing the amount of change in the image search region Ri. In this case, the image target Oi is not moving in the lateral direction, and the continuous detection number of times N is small. Therefore, it is determined that the probability that the camera sensor 32 is detecting a non-target object is highest. Thus, the image search region Ri is not expanded.

According to the above description, steps S41 to S43 and S45 function as a probability determination section.

As described above, in the third embodiment, the ECU 20 determines the probability that the target Ob recognized from a captured image acquired by the camera sensor 32 is not a target object targeted for changing the image search region Ri but a non-target object that is not targeted for changing the image search region Ri. The ECU 20 then sets the amount of change for changing the size of the image search region Ri on the basis of the result of probability determination. With the above configuration, the amount of change in the size of the image search region Ri is set on the basis of the probability that the camera sensor 32 is detecting a non-target object, which can prevent the image search region Ri from being expanded while the camera sensor 32 is detecting the image target Oi that is not targeted for changing the image search region Ri. Accordingly, reduction in determination accuracy can be prevented.

A target object is an object that moves, whereas a non-target object is a stationary object that does not move. The ECU 20 determines the probability on the basis of the amount of movement of the second position Pi during the time period during which an object is being detected by the camera sensor 32. With the above configuration, it is determined whether an object is a target object targeted for changing the image search region Ri or a non-target object on the basis of the amount of movement of the second position Pi. Accordingly, reduction in determination accuracy can be prevented due to the detection of a stationary non-target object associated with the expansion of the image search region Ri.

The ECU 20 determines whether the image target Oi is a target object that requires a change in the image target Oi or a non-target object on the basis of how often the camera sensor 32 detects the image target Oi. With the above configuration, reduction in determination accuracy can be prevented due to the incorrect detection of intangibles that temporarily occur such as light associated with the expansion of the image search region Ri.

Other Embodiments

The operation of the brightness determination section 16 for determining the brightness of the area surrounding the vehicle on the basis of the output from the illuminance sensor 33 is merely an example. Alternatively, the brightness determination section 16 may acquire the current time and determine the brightness of the area surrounding the vehicle on the basis of the current time. Still alternatively, the brightness determination section 16 may determine the brightness of the area in front of the own vehicle on the basis of a luminance value of a captured image generated by the camera sensor 32 capturing the area surrounding the own vehicle.

The image region setting section 14 may change the image search region Ri not only by expanding the image search region Ri but also by reducing the image search region Ri. In this case, the image search region Ri is reduced if the brightness of the area surrounding the vehicle is equal to or greater than a predetermined threshold value in steps S22 and S25 of FIG. 7, and the image search region Ri is expanded if the brightness of the area surrounding the vehicle is less than the threshold value.

The operation of setting the guard region GR in the image search region Ri depending on the distance r2 in step S28 of FIG. 7 is merely an example. For example, instead of setting the guard region GR, the amount of change in the size of the image search region Ri may be set depending on the distance r2, and the image search region Ri may be changed depending on the amount of change.

The reflected wave sensor is not limited to a radar sensor that uses millimeter waves, and may be a laser sensor that uses laser light as transmission waves or an ultrasound sensor that uses ultrasound as transmission waves.

The driving assist apparatus 10 may include the ECU 20 and the camera sensor 32 as an integrated device, instead of including the ECU 20 and the camera sensor 32 individually. In this case, the above-mentioned ECU 20 is provided inside the camera sensor 32.

The present disclosure has been described with reference to examples, but it is to be understood that the present disclosure is not limited to the examples and the structures thereof. The present disclosure covers various modifications and equivalent variations. In addition to various combinations and forms, other combinations and forms including one or more/less elements thereof are also within the spirit and scope of the present disclosure.

The invention claimed is:

1. An object detection apparatus that detects an object present around a vehicle by using a reflected wave sensor and a camera sensor, the reflected wave sensor being configured to transmit transmission waves and acquire a distance to the object based on reflected waves corresponding to the transmission waves, the camera sensor being configured to capture the object and acquire a captured image, the object detection apparatus comprising:

a reflection region setting section that sets, with reference to a first position that is a detection position of the object detected by the reflected wave sensor, a region including the first position as a reflected wave search region;

an image region setting section that sets, with reference to a second position that is a detection position of the object detected by the camera sensor, a region including the second position as an image search region;

an object determination section that recognizes the object detected by the reflected wave sensor and the object detected by the camera sensor as the same object on condition that there is an overlapping region between the reflected wave search region and the image search region; and a brightness determination section that determines brightness in a direction in which the object is detected by the camera sensor, wherein the image region setting section changes a size of the image search region based on the determined brightness in the direction in which the object is detected.

2. The object detection apparatus according to claim 1, wherein the image region setting section sets an amount of change for changing the size of the image search region based on a distance from the camera sensor to the second position.

3. The object detection apparatus according to claim 1, wherein the camera sensor captures an area in front of the vehicle, and the image region setting section sets an amount of change for changing the size of the image search region based on a vertical orientation of an optical axis of a headlight of the vehicle.

4. The object detection apparatus according to claim 1, wherein if the object determination section has already recognized the object detected by the reflected wave sensor and the object detected by the camera sensor as the same object, the image region setting section maintains the size of the image search region even when a determination result by the brightness determination section is changed.

5. The object detection apparatus according to claim 1, comprising a type determination section that determines a type of the object, wherein
the image region setting section sets an amount of change for changing the size of the image search region based on the type determined by the type determination section.

6. The object detection apparatus according to claim 1, comprising a probability determination section that determines a probability that the object recognized from the captured image acquired by the camera sensor is not a target object targeted for changing the image search region but a non-target object that is not targeted for changing the image search region, wherein
the image region setting section sets the amount of change for changing the size of the image search region based on a determination result provided by the probability determination section.

7. The object detection apparatus according to claim 6, wherein
the target object is an object that moves, and the non-target object is a stationary object that does not move, and
the probability determination section determines the probability based on an amount of movement of the second position during a time period during which the camera sensor is detecting the object.

8. The object detection apparatus according to claim 6, wherein
the probability determination section determines the probability based on how often the camera sensor detects the object.

9. An object detection method of detecting an object present around a vehicle by using a reflected wave sensor and a camera sensor, the reflected wave sensor being configured to transmit transmission waves and acquire a distance to the object based on reflected waves corresponding to the transmission waves, the camera sensor being configured to capture the object and acquire a captured image, the object detection method comprising:

a reflection region setting step of setting, with reference to a first position that is a detection position of the object detected by the reflected wave sensor, a region including the first position as a reflected wave search region;

an image region setting step of setting, with reference to a second position that is a detection position of the object detected by the camera sensor, a region including the second position as an image search region;

an object determination step of recognizing the object detected by the reflected wave sensor and the object detected by the camera sensor as the same object on condition that there is an overlapping region between the reflected wave search region and the image search region; and a brightness determination step of determining brightness in a direction in which the object is detected by the camera sensor, wherein the image region setting step changes a size of the image search region based on the determined brightness in the direction in which the object is detected.

* * * * *